United States Patent [19]

Archibald et al.

[11] 4,078,471

[45] Mar. 14, 1978

[54] FASTENING DEVICE

[75] Inventors: James B. Archibald; Reuben Weinstein, both of Schenectady, N.Y.

[73] Assignee: General Electric Company, Schenectady, N.Y.

[21] Appl. No.: 775,625

[22] Filed: Mar. 8, 1977

[51] Int. Cl.² .......................................... F16B 13/06
[52] U.S. Cl. ...................................................... 85/67
[58] Field of Search ................. 85/67, 69, 79, 64, 70, 85/71; 403/388

[56] References Cited

U.S. PATENT DOCUMENTS

| | | | |
|---|---|---|---|
| 1,953,636 | 4/1934 | Skelton | 85/67 X |
| 2,573,928 | 11/1951 | Peter | 85/67 X |
| 3,009,747 | 11/1961 | Pitzer | 85/69 X |
| 3,168,338 | 2/1965 | Spieth | 85/70 X |
| 3,192,820 | 7/1965 | Pitzer | 85/69 |
| 3,304,829 | 2/1967 | Raynovich | 85/87 X |
| 3,618,992 | 11/1971 | Whistler et al. | 85/64 X |
| 3,677,588 | 7/1972 | Coffield | 151/41.7 X |
| 3,834,666 | 9/1974 | Keith | 151/38 X |

*Primary Examiner*—Ramon S. Britts
*Attorney, Agent, or Firm*—John F. Ahern; Herbert E. Messenger; James W. Mitchell

[57] ABSTRACT

A fastening device is provided which is suitable for holding large structural members in firm sealing engagement and in alignment with respect to each other and which can be easily placed in assembled position even when it must be employed in a confined area which is difficult of access. The fastening device includes a bolt having threaded portions at each end and an intermediate body portion. The threaded portions are of different pitch to insure insertion in the proper direction. The body portion is formed to include a shank having a shoulder near one end and a relatively wide groove at the other end. A snap ring is placed in the groove. Alternating male and female rings, having abutting tapered edges, are positioned between the shoulder and the snap ring and are parts of the body portion. The female ring is split so that as a longitudinal force is exerted by the shoulder when the fastening device is screwed into a threaded recess in one of the structural members the female ring is caused to be expanded into firm engagement with the walls of the apertures in which the fastening device is placed. The female ring is positioned to extend across the plane of the abutting surfaces of the structural members so that expansion of the female ring against walls of the apertures corrects any initial misalignment of the apertures and of the structural members. The male rings are solid members and the inside diameter thereof exceeds that of the section of the shank adjacent which the male members are placed. The resulting clearance allows a slight radial shifting of the rings to facilitate easy insertion of the fastening device despite misalignment between the axis of a threaded recess in which one threaded end of the bolt body is received and the axis of the aperture adjacent the threaded recess and despite initial misalignment of the structural members.

9 Claims, 6 Drawing Figures

FASTENING DEVICE

BACKGROUND OF THE INVENTION

1. Field of the Invention

This invention relates to fastening devices and more particularly to adjustable reusable bolts for fastening structural parts in firm engagement and in alignment relative to each other.

2. Description of the Prior Art

In assembling structural components in firm engagement, it is frequently necessary to insert a bolt or other fastening device in an opening which is difficult of access and where, for example, the assembly may have to be accomplished using only one hand. For example, in large generators, it is customary to form the end shields in two portions abutting along a horizontal plane. The upper and lower end shield portions are usually formed with inwardly extending flanges forming the abutting surfaces and aligned apertures are provided in the flanges for receiving fastening bolts. Because the flanges extend inwardly, they are accessible only through manholes in the generator casing which frequently allow access to the bolts with only one arm and with the assembler in many cases being unable actually to see the openings into which the bolt is to be assembled.

In prior art structures of this type, it has been considered desirable to employ a bolt which has a body portion having as close a fit as possible with the walls of the apertures in the upper and lower portions of the end shield in which the bolt is to be received. However, because of the difficulty of access, where bolts having the desired close fit have been used, inserting the bolts into the apertures has involved great difficulty. Also, because it is difficult to form the tapped recess into which the threaded portion of the bolt is to be inserted in precise axial alignment with the apertures, it has been found necessary to accept less than a perfect fit between the body portion of the bolt and the walls of the apertures. Thus, in order to insure ability to insert the bolt under the difficult access conditions and with the aforementioned lack of precise axial alignment, it has been found necessary to provide clearance between the body portion and the walls of the apertures. While such clearance facilitates insertion of the bolt, it has permitted some slight misalignment of the vertical faces on the upper and lower portions of the end shield, and even a very small step in these vertical faces resulting from such misalignment can be sufficient to result in leakage of hydrogen which is employed for cooling such large generators.

The prior art discloses fastening devices, including adjustable bushings, for effecting a very tight radial fit with the side walls of an opening in which such fastening devices are received. For example, such devices manufactured by Adjustable Bushing Corporation include alternate male and female tapered rings which expand radially as a longitudinal force is exerted thereon. Such fastening devices may be formed as bolts which extend entirely through aligned openings or may be formed to be received in a blind recess.

In accordance with the present invention, fastening devices of the type referred to in the preceding paragraph have been modified to make them effective for assembling heavy structural members, such as generator end shields or other components, where accessibility is difficult and where assembly and disassembly may have to be effected using only one hand.

It is, therefore, an object of this invention to provide a fastening device which can be employed to effect assembly of structural members where access is limited.

It is another object of this invention to provide such a fastening device which may be placed in assembled position and removed therefrom using only one hand.

It is still a further object of this invention to provide a fastening device which, despite the difficulty of access, enables a firm sealing engagement to be effected between abutting structural members with the use of a minimal number of such fastening devices.

It is another object of this invention to provide a fastening device which automatically effects alignment of heavy structural members which may be slightly out of alignment before the fastening device is placed in assembled position.

It is still another object of this invention to provide a fastening device which facilitates easy assembly under difficult access conditions even though a recess which receives the threaded portion of the fastening device may be out of alignment with an adjacent aperture which receives the body portion of the fastening device.

SUMMARY OF THE INVENTION

A fastening device is provided which is suitable for holding large structural members in firm sealing engagement and in alignment with respect to each other and which can be easily placed in assembled position even when it must be employed in a confined area which is difficult of access. The fastening device includes a bolt having threaded portions at each end and an intermediate body portion. The threaded portions are of different pitch to insure insertion in the proper direction. The body portion is formed to include a shank having a shoulder near one end and a relatively wide groove at the other end. A snap ring is placed in the groove. Alternating male and female rings, having abutting tapered edges, are positioned between the shoulder and the snap ring and are parts of the body portion. The female ring is split so that as a longitudinal force is exerted by the shoulder when the fastening device is screwed into a threaded recess in one of the structural members the female ring is caused to be expanded into firm engagement with the walls of the apertures in which the fastening device is placed. The female ring is positioned to extend across the plane of the abutting surfaces of the structural members so that expansion of the female ring against walls of the apertures corrects any initial misalignment of the apertures and of the structural members. The male rings are solid members and the inside diameter thereof exceeds that of the section of the shank adjacent which the male members are placed. The resulting clearance allows a slight radial shifting of the rings to facilitate easy insertion of the fastening device despite misalignment between the axis of a threaded recess in which one threaded end of the bolt body is received and the axis of the aperture adjacent the threaded recess and despite initial misalignment of the structural members.

DESCRIPTION OF THE PREFERRED EMBODIMENT

Figure 1:
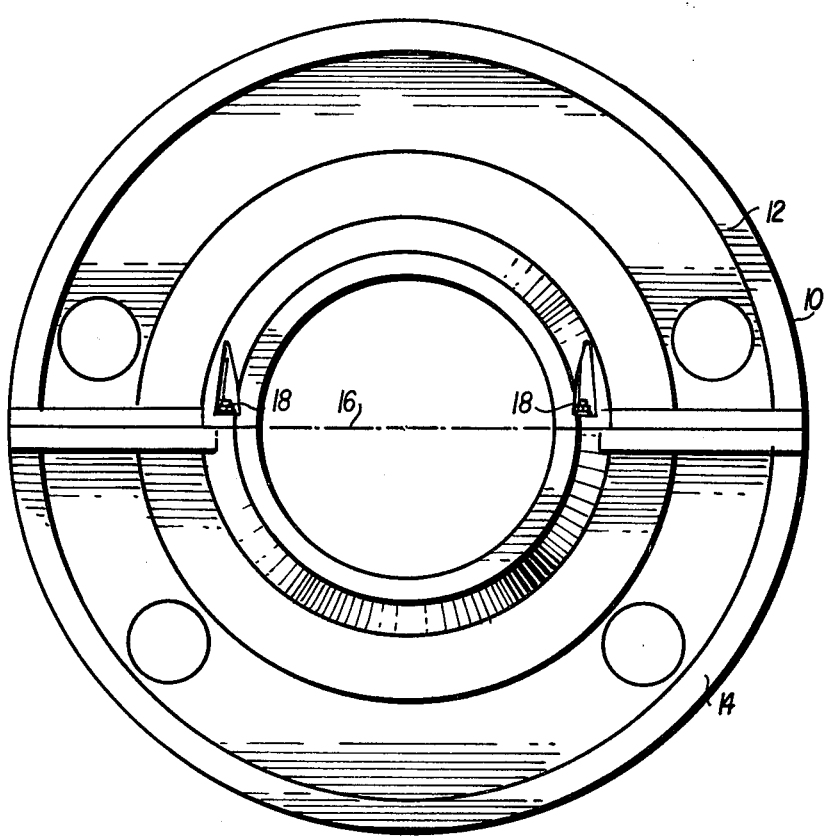
FIG. 1 is an elevation view of the end shield of a large generator, viewed from the interior of the generator.

Referring first to FIG. 1, there is shown a general view of the interior of an end shield 10 employed with a large generator and incorporating the fastening device of this invention. The end shield is formed in two structural members. These structural members include an upper portion 12 and a lower portion 14. The portions of the end shield, in assembled position, abut along a plane surface indicated by the line 16. Inwardly extending flanges are formed on the end shields to provide the abutting surface, and fastening devices, indicated at 18, are employed to hold the upper and lower portions of the end shield in assembled relation and to maintain the abutting surfaces in firm sealing engagement and in alignment relative to one another.

Figure 2:
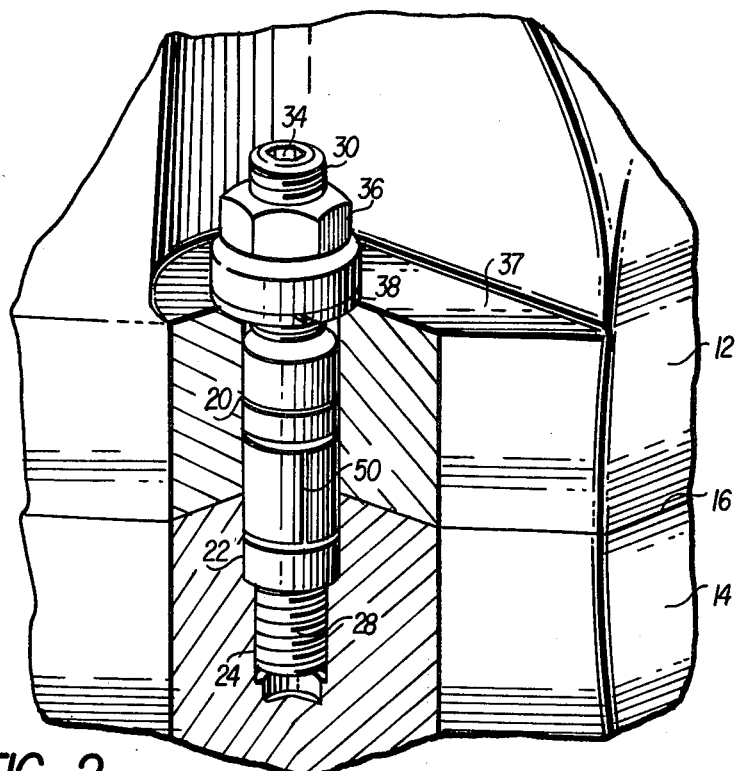
FIG. 2 is an enlarged view of a portion of the end shield of FIG. 1, showing the fastening device of this invention.

Referring now to FIG. 2 where the structure is shown in enlarged form in greater detail, it can be seen that the upper portion 12 of the end shield is formed to include an aperture 20 extending through the flange formed in the upper portion of the end shield and providing the abutting surface thereof. An aperture 22, which is to be aligned with the aperture 20, is formed in the lower portion 14 of the end shield. Adjacent the lower end of the aperture 22 there is formed a threaded recess 24 for receiving a threaded portion of the fastening device.

As shown in FIG. 1, two fastening devices 18 are employed to hold the upper and lower portions of the end shield in firm sealing engagement and alignment relative to one another. The end shield is of substantial size and it forms part of the enclosing casing of a large generator. Such large generators are usually cooled by a gas such as hydrogen and it is important that there be no leaks in the casing which could permit escape of hydrogen. It is essential therefore, that the upper and lower portions of the end shield by held in firm sealing engagement and alignment relative to one another at their abutting faces.

In the construction of generators of this type in the prior art it has been customary to employ a fastening device which includes a body portion receivable in apertures, such as 20 and 22, and a threaded portion at the end receivable in a recess, such as 24. In order to insure firm sealing engagement of the upper and lower portions of the end shield and thereby to insure against leakage of hydrogen from the interior of the casing in this area, it is desirable to employ a fastening device which includes a body portion having a close fit with the apertures. This minimizes any possibility of even slight misalignment of vertical faces on the upper and lower portions of the end shield which could result in leakage of gas from the interior of the casing. Since, however, the fastening devices are arranged in the interior of the end shield, access to the area at which the fastening devices are to be inserted is difficult. Such access is usually through relatively small manholes within the casing and frequently the apertures are located so that the person attempting to insert or remove the fastening device is unable to see the area at which the fastening device is to be inserted and must accomplish this by "feel". Where the body portion of the fastening device has a close fit with the aperture it is quite difficult to insert the fastening device in the aperture and to secure threaded engagement with the threaded recess. It is also difficult to remove the fastening device when disassembly becomes necessary because of the confined area in which the individual must work and the somewhat awkward access to the fastening device.

Moreover, it has been found difficult to insure, during the machining operation, that the axis of the aperture 22 is perfectly aligned with the axis of the threaded or tapped recess 24. Where there is even a slight misalignment of these axes and a close fit of the shank portion with the aperture is provided, it may be impossible to achieve threaded engagement of the threaded portion of the fastening device with the threaded recess.

Further, when the upper and lower portions of the end shield are initially assembled the apertures 20 and 22, and the upper and lower portions of the end shield, may be slightly misaligned. Even slight misalignment can result in leakage of cooling gas from the interior of the casing.

In accordance with the present invention, these problems and limitations of prior art approaches have been eliminated and a fastening device is provided which can be easily assembled within the apertures and easily removed when necessary and this may be accomplished in a confined space and with poor access to the area where the fastening device is to be inserted.

Figure 3:
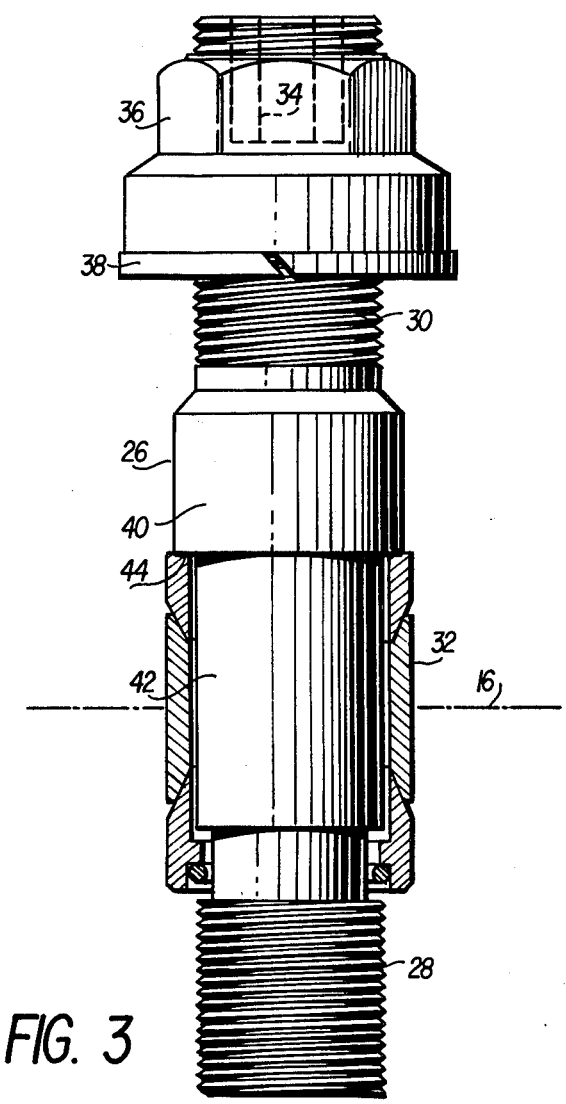
FIG. 3 is a view, partly in section, and still further enlarged, of the fastening device of this invention.

Referring now to FIG. 3, the fastening device of this invention includes a bolt, indicated generally by the numeral 26. The bolt 26 includes at one end thereof a first threaded portion 28 and at the other end thereof a second threaded portion 30. The threads on the portions 28 and 30 preferably have a different pitch so that, even working blind, it is impossible to insert the fastening device of this invention in the apertures and threaded recess in the wrong direction, since only the first threaded portion 28 has threads with a pitch corresponding to that employed in the recess 24. Between the first and second threaded portions, the bolt includes a body portion 32, which is adapted to be received in the apertures 20 and 22.

The head or upper end of the bolt is formed to include a recess 34 of hexagonal cross-section for receiving a suitable wrench which is employed to turn the bolt for screwing the threaded portion 28 into the threaded recess 24. A nut 36 is arranged in engagement with the threaded portion 30. After the bolt is assembled in the apertures 20 and 22 and the threaded recess 24, the nut 36 may be turned down on the threaded portion 30 to engage the upper portion of the end shield at the shoulder 37 in order to urge the upper portion 12 into firm sealing engagement with the lower portion 14. It is contemplated that the nut 36 will be of the locking type for example, one of the nuts known in the trade as Elastic Stop Nuts, but additionally a lock washer 38 is preferably employed with a nut 36 to further insure against loosening of the nut after assembly had been completed.

Figure 4:
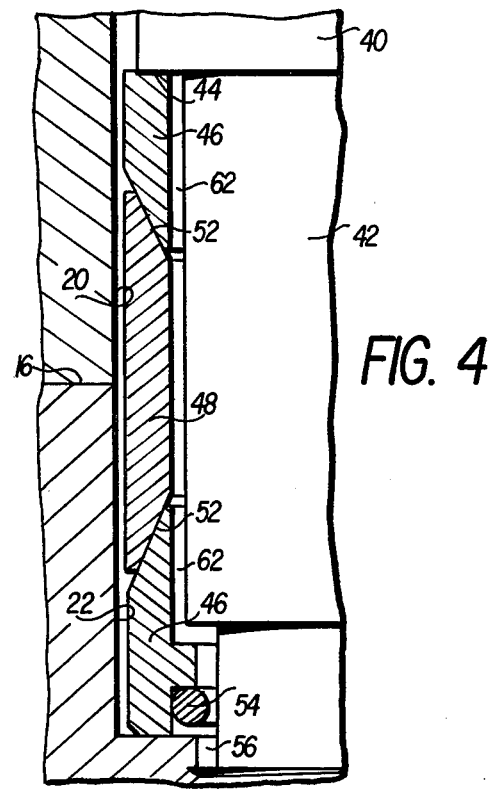
FIG. 4 is a still further enlarged view of a portion of the fastening device shown in FIG. 3, the portion being shown in its relationship to apertures in which the fastening device is received.

In accordance with this invention the bolt 26 is formed to include a first section 40 of larger diameter and a second section or shank 42 of smaller diameter, a shoulder 44 being formed at the junction between the two aforementioned sections of the bolt. The shank 42 forms part of the body portion 32. As shown in FIG. 4, the section 40 is of smaller diameter than the diameter of the apertures 20 and 22. Although FIG. 4 is somewhat exaggerated in order to show relationship of parts and the clearance would not be as great as that shown in that figure, the shank 42 of smaller diameter, is spaced from the walls of the apertures 20 and 22. In order to provide for firm engagement between the fastening device and the walls of these apertures a plurality of rings having abutting tapered edges are positioned around the shank 42 of the bolt to form the body portion 32 of the fastening device. These rings are alternately male and female. Specifically they include at each end a male ring 46 and, intermediate to these two male rings, a female ring 48. The female ring 48 is split longitudinally, as indicated at 50 in FIG. 2, in order to permit expansion of this ring to effect engagement of the body portion of the fastening device with the walls of the apertures. The abutting edges of the male rings and the female ring are tapered as indicated at 52, so that as a longitudinal force is exerted on the male rings to urge them toward each other the tapered edges effect a radial expansion of the female ring into engagement with the walls of the apertures 20 and 22. The female ring is specifically arranged so that it extends across the plane indicated by the numeral 16, this numeral indicating the abutting surfaces of the upper and lower portions of the end shield. Because of this positioning of the female ring, this ring, upon expanding, corrects any initial misalignment of the apertures 20 and 22, and thus brings into alignment the upper and lower portions of the end shield and vertical faces thereon. The alignment thus accomplished insures against leakage of cooling gas from the interior of the casing. While the female ring 48 is a split ring so as to permit its expansion into firm engagement with the walls of the apertures, the male rings are solid rings and maintain the same inside diameter during such movement of the male rings.

In order to retain the rings in assembled position on the bolt when the fastening device is not positioned within the apertures, a snap ring 54 is provided adjacent the lower of the male rings 46. In order to hold the snap ring in position on the bolt but still permit longitudinal movement of the snap ring relative to the bolt when required during assembly of the fastening device in the apertures, a relatively wide groove 56, exceeding the thickness of the snap ring, is formed in the bolt for receiving the snap ring. The width of the groove 56 is such that the snap ring 54 is permitted to move a significant distance longitudinally relative to the bolt when a force is applied to urge the male rings toward each other. The lower male ring 46 has a recess or rabbet 58 formed in the lower end thereof, and the snap ring 54 is received in this recess so that the lower end of the male ring may directly engage a shoulder 60 formed at the lower end of the aperture 22.

In the machining operations for forming the aperture 22 in the lower portion 14 of the end shield and forming of the tapped or threaded recess 24 adjacent the lower end of the aperture 22 it has been found difficult to insure that the axis of the threaded recess is precisely in line with the axis of the aperture 22. As a result when it is attempted to employ a conventional bolt having a fixed shank and threaded portion and to have a close fit, akin to a dowel fit, between the shank and the walls of the apertures 20 and 22, it has been found difficult or impossible to bring the threaded portion of such a bolt into proper engagement with the threaded recess. This difficulty is not overcome by expandable bolts of the prior art, even those using split expandable rings, since those presently available have minimal clearance between the inside diameter of the male and female rings and the outside diameter of the shank of the bolt. With such prior art bolts, where the threaded recess is misaligned with the adjacent bolt-receiving recess, such prior art expandable bolt cannot be successfully inserted and removed.

The fastening device of this invention is constructed so that, even though the axis of the threaded recess may be slightly offset radially from the axis of the aperture 20, the fastening device may still be readily assembled in threaded relationship while also providing a close fit with the walls of the apertures. In order to provide for slight radial shifting of the male and female ring assembly relative to the axis of the threaded portion 28, when the axes of the threaded recess 24 and the aperture 22 are slightly radially offset, the male rings are formed of a diameter which is slightly larger than that of the shank 42 of the bolt 26 on which they are assembled, providing a clearance, designated by the numeral 62 in FIGS. 4 and 5, between the male rings and the shank. This allows shifting of the rings relative to the shank and makes the fastening device self-centering so as to compensate for any initial misalignment of the apertures 20 and 22 and misalignment of the threaded recess 24 relative to the aperture 22. Moreover, the female ring is positioned so that when the fastening device is screwed into assembled position, the expansion of the female ring automatically corrects any initial misalignment of the apertures 20 and 22 and of the upper and lower portions of the end shield.

Figure 5:
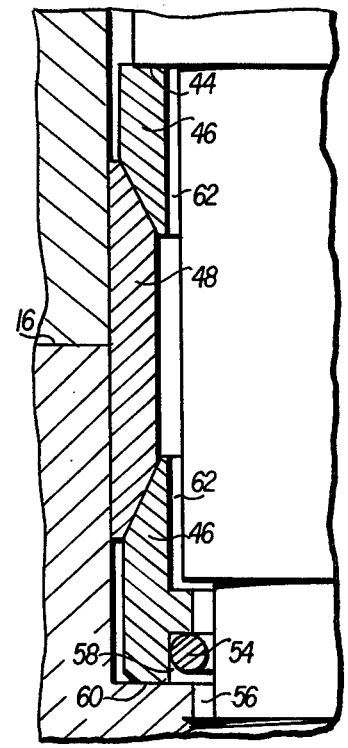
FIG. 5 is a view similar to FIG. 4 illustrating a portion of the fastening device when a longitudinal force has been exerted thereon.

In one specific embodiment of this invention the inside diameter of the male rings was 1.313 inches and the diameter of the shank 42 of the bolt was 1.188, thereby providing approximately 1/16 inch clearance in the area designated 62 in FIGS. 4 and 5. It can be readily understood that, because of this clearance, when the fastening device is assembled in the apertures, should the axis of the threaded recess 24 be slightly offset from the aperture 22, the male rings may move radially relative to the shank 42 of the bolt in a direction to compensate for this offset, thereby reducing the radial clearance slightly at one point and increasing it at the diametrically opposite point. Moreover, this adjustment is accomplished automatically as the fastening device is inserted so that, even though the person making the assembly is working in an awkward and confined position and even without view of the area where the fastening device is inserted, he can readily screw the fastening device into assembled position. Finally, as the fastening device is screwed into its assembled position it automatically corrects any initial misalignment of the upper and lower portions of the end shields.

Referring particularly to FIGS. 2, 4 and 5, when it is desired to effect firm sealing engagement and alignment between the abutting surfaces of the upper and lower portions of the end shield a fastening device made in accordance with this invention is inserted in each of the sets of apertures in the upper and lower portions of the end shield. In the particular embodiment shown it is contemplated that two such fastening devices will be adequate to effect such aligned sealing engagement. Even when working within an awkward and confined space the assembler may easily insert the fastening device through the aperture 20 and into the aperture 22. Because of the clearance between the male rings 46 and the shank 42 of the bolt, the threaded portion 28 may be readily brought into threaded engagement with the threaded recess 24 even though, as is usually the case, the axis of the recess is slightly offset from the axis of the aperture 22. The fastening device is then screwed into firm threaded engagemement in the recess by inserting a wrench in the hexagonal recess 34 in the head thereof. As the bolt is turned by means of the wrench and screwed into the threaded recess 24 the shoulder 44 moves downwardly, engaging the upper male ring and moving that ring downwardly. Downward movement of the lower male ring 46 is ultimately limited by engagement with shoulder 60 at the bottom of the aperture 22. Further turning of the bolt body by means of the wrench causes a longitudinal force to be applied to the male rings 46 by the shoulder 44 in cooperation with the shoulder 60.

The result of the exertion of this longitudinal force is illustrated in FIGS. 4 and 5. FIG. 4 shows the male and female rings 46 and 48 in the positions they occupy before the bolt has begun to be screwed into place and where no significant longitudinal force is exerted on the rings. As the bolt is screwed into the threaded recess the downward movement of the shoulder 44 moves the male rings toward each other into the position shown in FIG. 5. Such movement causes the abutting taperred edges of the male and female rings to expand the female ring into firm engagement with the walls of the apertures 20 and 22 to provide the desired "dowel fit". At the same time this expansion of the female ring exerts a force on the walls of the apertures 20 and 22, which may be slightly out of alignment initially, and causes a relative lateral shifting of the upper and lower portions 12 and 14, respectively, of the end shield to bring the apertures 20 and 22 and upper and lower portions of the end shield into alignment. The female ring extends, as illustrated, across the plane of the abutting surfaces of the upper and lower portions of the end shield, indicated by the numeral 16. This positioning of the female ring 48 extending across the abutting surfaces insures alignment of the apertures 20 and 22 as the female ring is expanded. As further illustrated in FIG. 5 this movement of the male rings toward each other as the bolt body is screwed into the threaded recess 24 does not change the clearance relationship between the inner diameter of the male rings and the shank 42 of the bolt from the relationship which existed at the time the threading operation began.

The lock washer 38 is then placed on the bolt body and the nut 36 is screwed onto the threaded portion 30 of the bolt body and tightened firmly against the shoulder 37 of the upper portion 12 of the end shield to bring the upper and lower portions 12 and 14 of the end shield into firm sealing engagement.

At any time when it is necessary to remove the fastening devices this can be accomplished by simply unscrewing the nut 36 and then turning the bolt in the opposite direction by means of a wrench inserted in the hexagonal recess 34. As the bolt is turned by means of the wrench the longitudinal force acting on the rings 46, 48 is reduced and the female ring 48 returns to its unexpanded position because of the resilience of this ring, thereby allowing the fastening device to be easily removed from the apertures 20 and 22 after it has been unscrewed from the threaded recess 24.

Figure 6:
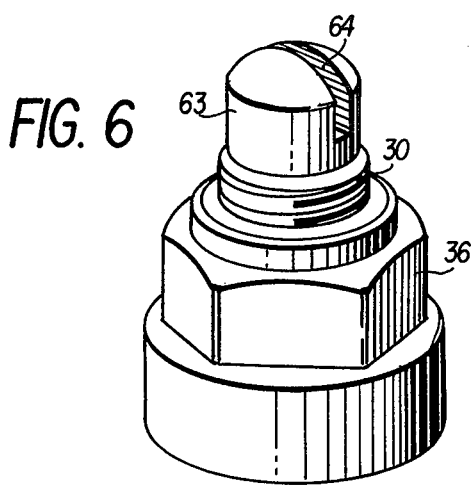
FIG. 6 is a view of the upper portion of the fastening device incorporating a modified embodiment of this invention.

Another embodiment of the fastening device of this invention is shown in FIG. 6. The embodiment shown in FIG. 6 differs from that previously described only in the construction of the head portion at the upper end of the bolt. In lieu of the hexagonal recess in the head of the bolt the embodiment shown in FIG. 6 includes a portion 62 extending beyond the threaded portion 30. A slot 64 is formed in the portion 62 extending transversely thereof. A suitable tool may readily be inserted in the slot for screwing the bolt body into its assembled position or for unscrewing it as desired.

While specific embodiments of this invention have been shown and described, it is not intended that the invention be limited to the particular constructions shown and described, and it is intended, by the appended claims, to cover all modifications which come within the spirit and scope of the claims.

We claim:

1. A fastening device for connecting together and providing proper alignment for a plurality of structural members which may normally be misaligned prior to assembly, the structural members having apertures therein for receiving the fastening device and one of the structural members having a threaded recess adjacent an end of the aperture therein, said fastening device comprising:
    (a) a bolt including a first threaded portion at one end adapted to be received in the threaded recess of said first structural member to be joined thereby to said second structural member and a second threaded portion at the other end of said bolt adapted to extend beyond the aperture in the other of said structural members;
    (b) said bolt further including a shank between said threaded portions, said shank being adapted to be received in said apertures;
    (c) a plurality of rings disposed on said shank and forming with said bolt shank a body portion of said device, said rings including abutting tapered edges and being alternately male and female, said female ring being split, whereby longitudinal force applied to said rings causes the female ring to expand radially to engage the walls of said apertures;
    (d) means on said bolt for effecting turning of said bolt to thread said first threaded portion into said threaded recess of said first structural member;
    (e) means on said bolt for applying a longitudinal force on said rings when said first threaded portion is threaded into said recess, the longitudinal force on said rings causing said female ring to be expanded into firm engagement with the walls of said apertures to align said apertures and provide a dowel fit between said apertures and said body portion of said device; and
    (f) a nut threadably engaging said second threaded portion and adapted to engage the other of the structural members to force said structural members into firm sealing engagement.

2. The fastening device of claim 1, wherein said means for effecting turning of said bolt includes a wrench-receiving recess in the end of said second threaded portion.

3. The fastening device of claim 1, wherein said means for effecting turning of said bolt includes a slot adjacent said second threaded portion for receiving a turning tool.

4. The fastening device of claim 1, wherein the inside diameter of said rings exceeds the diameter of said shank to provide clearance between said rings and said shank, permitting said rings to shift radially relative to said shank to facilitate easy insertion of said fastening device despite misalignment between the threaded recess and the aperture in said one of said structural members and despite initial misalignment of the structural members and the apertures therein.

5. The fastening device of claim 1, wherein the pitch of the thread of said first threaded portion differs from the pitch of the thread of said second threaded portion to insure that said fastening device can be inserted in said apertures and said recess in only one direction.

6. The fastening device of claim 1, wherein said means for applying a longitudinal force on said rings includes a shoulder formed on said shank adjacent one end of said rings, said rings being arranged to be longitudinally compressed between said shoulder and a portion of said one of the structural members adjacent said recess when said fastening device is screwed into said recess.

7. The fastening device of claim 6, and further including a groove formed in said shank adjacent the other end of said rings, and a snap ring received in said groove for retaining said rings on said shank between said shoulder and said snap ring.

8. The fastening device of claim 7, wherein the width of said groove in said shank exceeds the thickness of said snap ring to permit longitudinal movement of said snap ring when the longitudinal force is exerted on said rings.

9. The fastening device of claim 1, wherein said female ring is positioned so as to extend across a plane defined by the abutting surfaces of the structural members, whereby radial expansion of said female ring when longitudinal force is applied is effective to correct any initial misalignment of the structural members.

* * * * *